Oct. 30, 1928.
C. A. FORSSELL
1,689,281
JOINT IN IRON STRUCTURES AND REENFORCING MEMBERS
Filed Oct. 4, 1924
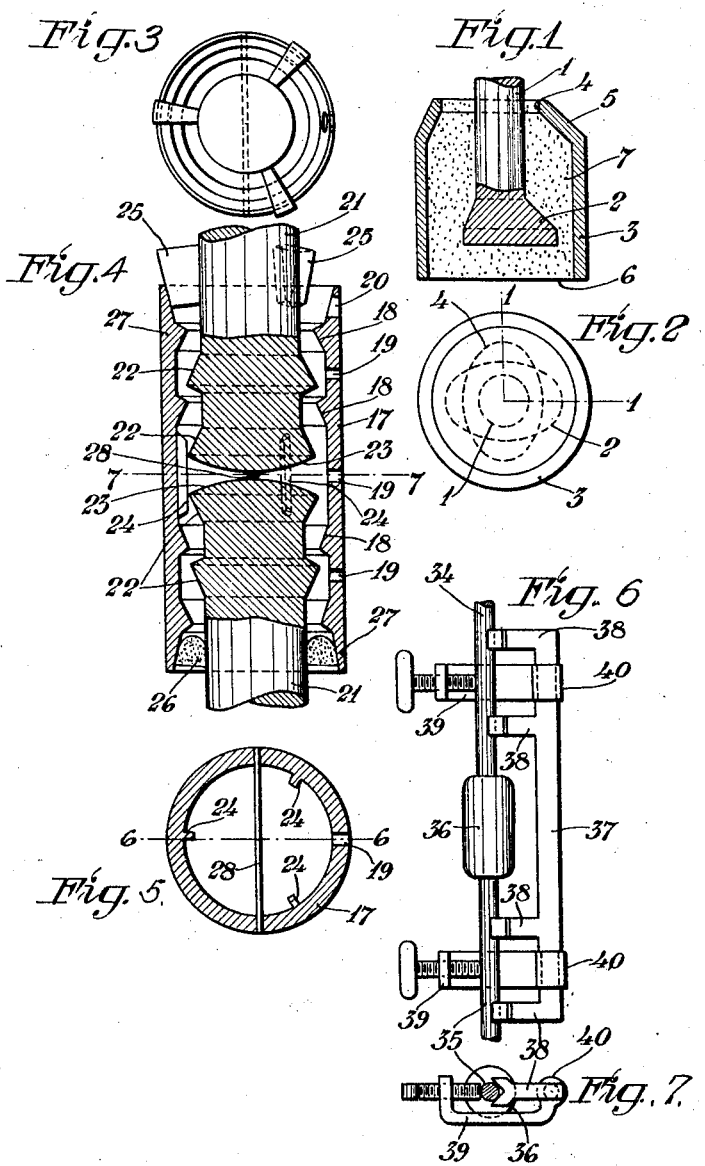
Inventor
C. A. Forssell Patented Oct. 30, 1928.

1,689,281

UNITED STATES PATENT OFFICE.

CARL ABRAHAM FORSSELL, OF STOCKHOLM, SWEDEN.

JOINT IN IRON STRUCTURES AND REENFORCING MEMBERS.

Application filed October 4, 1924, Serial No. 741,749, and in Sweden October 29, 1923.

The present invention refers to an arrangement in joints in reenforcing members for reenforced concrete, and consists in that an iron rod or the like having an uneven surface is surrounded by and located substantially concentrically in a preferably closed sleeve or pipe or pipe members, likewise provided with an irregular surface, and having two or more ends, said sleeve or pipe being in the following designated "sleeve", and consisting of iron or other suitable metal, the sleeve being filled with a mass encasing the iron rod and consisting of a material which solidifies on being cast into the sleeve, the said material offering a resistance to the movements of the iron rod relatively to the sleeve.

In a joint between two iron rods, the two joined ends of the rods are either provided each in one end of a common sleeve, or each in a separate sleeve, said sleeves being united in some way or other. In anchoring the end of an iron rod in concrete, brickwork or the like, the sleeve surrounding the anchored end of the rod either forms an anchor plate itself, or, it may be connected in known manner with such a plate, or, the sleeve may be connected in known manner to another structure, onto which anchoring is thus effected.

The resistance of the solidified mass against movements of the iron rods relatively to the sleeve principally depends on the engagement of the mass into irregularities on the surfaces of the rod and the sleeve.

The sleeve may consist of ingot-iron, and may be entirely rolled, welded, made in the form of a steel casting, or produced in some other known manner, or, the sleeve may consist of cast iron, preferably malleable cast iron, or of steel. The cross section of the sleeve may be circular, oval, square, or the sleeve may be of the profile iron type. The iron rod may consist of ingot-iron, or of steel, and it may be of a circular, oval, square or rectangular cross section, or it may be of some profile iron type, or be sectioned in some other known way.

The solid mass encasing the iron and filling the sleeve may consist of solidified cement puddle, cement mortar, concrete or the like, quickly solidifying special cements being then preferably used, such as the French cement "ciment fondu" or some Swedish cement from Hellekis or Maltesholm. When the special cement thus employed is not used for the other cement work carried out at the same time, the same may preferably be coloured so as to be readily recognizable.

The solid mass may also consist of metals having a lower melting point than the iron rod or the material of the sleeve, so that the parts are not injured, when the subsequently solidifying mass is being cast into the sleeve. For this purpose bearing metal such as whitemetal or the like will be found suitable.

To facilitate ready casting of the solidifying mass in a liquid state into the sleeve when the latter assumes a vertical or slanting position, the sleeve may in one or both ends be provided with a funnel-shaped device. This funnel-shaped device may also be adapted to facilitate convenient packing between the iron rod and the sleeve, when desired, in order to prevent leaking out of the mass in the casting process. The same also allows the production of contraction cavities in the surface of the solidifying newly-cast mass to take place without the mass loosing its contact with the inside of the sleeve proper.

If the sleeve is situated in a horizontal or nearly horizontal position, when the mass is to be cast into the same, the sleeve, or, if desired, a funnel provided at the end thereof, or both the sleeve and the funnel, may be provided with apertures located in such a manner as to facilitate the casting of the subsequently solidifying mass, as well as the escape of the air enclosed in the sleeve, when the mass is being cast.

The irregularities on the surface of the iron rod may be arranged in the form of one or more annular swells, such as one or more spirally extending swells in the form of projections, pricks, warts or the like. The irregularities on the surface of the iron rod may consist in such as are provided on special irons having an uneven surface, for instance Ransome-iron, Tacher-iron or other known types. The irregularities on the surface of the iron rod may be arranged with the base of the outer contour having a circular, oval, rectangular or some other shape. An annular swell may preferably be of conical shape and, if only one swell is used on the iron rod, the same may be provided at the end thereof.

The irregularities on the inside of the sleeve may preferably be of the same kind as those set forth above and appearing on the surface of the iron rod. On the inside of the sleeve, there may thus be arranged annular or spiral restrictions, pricks and so forth.

When the iron rod is provided with a swell and the sleeve with a restriction, such swell and restriction may preferably be so arranged, that the former is fitted accurately to the latter, but so as to pass freely therethrough. An oval or similar swell on the iron rod may then, preferably, be turned about 90 degrees with respect to an oval restriction in the sleeve fitting thereto.

If the swells of the iron rods and the restrictions of the sleeve are arranged as projections, pricks, or the like, the latter may be arranged in longitudinal rows, and be provided in the structure in such a manner that the projections of the iron rod and of the sleeve in a longitudinal row are situated on the same line.

In order to facilitate fitting of the iron rod to the proper distance within the sleeve, the latter may be provided with crossties, or with one or more inside projections, or with both, which arrangement is provided in the place where the end surface of the iron rod is to be located, the device in question being so arranged, that the end of the iron rod is prevented by the said device from moving past its suitable position, the iron rod being thus readily adjusted into the said position with the support of the said device. The crossties may, for instance, consist of an iron wire or the like extended transversally of the sleeve, or it may consist of an inner projection, or an inward bulge in the wall of the sleeve. The crossties and the projections may, preferably, be so devised that the end of the iron rod when inserted into the sleeve with the application of gentle force may be moved past the devices in question, the latter being then destroyed or not, as the case may be.

In order that an iron rod shall be transversally compelled to assume the proper, generally central position within the sleeve, the latter may, in the proximity of the intended position for the end surface of an iron rod, or in other places over a larger or smaller area, or at all of these points, be provided with preferably longitudinal ridges, or with pricks or the like, so arranged that the iron rod will, in the proximity thereof, be forced into the proper position. In the same manner, the iron rod may be provided with ridges, preferably extending in the longitudinal direction, or with pricks or the like so arranged that the iron member will, in the proximity thereof, be forced into the proper position within the sleeve.

The inside of the sleeve or the surface of an iron rod within the solidified mass in the sleeve, or both, may preferably be coated with a substance adapted to enhance the connection between them and the solidified mass; for instance, they may be tinned where the solidified mass consists of bearing-metal.

In providing the above mentioned arrangement, the iron rods, when consisting of rolled ingot-irons, may be provided with swells or with irregularities at the ends, or with both, either simultaneously with the rolling operation, or immediately after completion of the latter, while the said rods are still hot, or, the rods in question may, on having been cooled, be heated anew about their ends, at the building place or elsewhere, and be upset to the intended unevenness, with or without a pattern for shaping the ends. They may also be wrought in cold condition for being provided with the said irregularities.

In order to facilitate adjusting the two ends of the iron rod on both sides of a joint in such a manner that their center lines on both sides of the joint attain the desired direction relatively to each other, they may, preferably, be retained in some way or other at the same rod placed beside the joint during the compressing procedure. This rod is either removed prior to encasing the joined iron rod in concrete, or it may remain in place. The direction in which the two iron rod ends are attached relatively to each other is frequently that of the center lines along the same straight line, but the direction may also be such that the center lines form a continuous curved line, for instance a circle, or such as to provide a certain acute angle between them in the joint, for example an angle of 45 degrees, where in a reenforced concrete structure an iron rod subjected to shearing stresses is anchored to an iron rod subjected to a bending moment, or where in a lattice work a diagonal brace member is anchored to a frame rod.

In casting the solidifying mass into the sleeve through openings provided for this purpose, including the end of the sleeve, this casting is preferably effected to such an excess that the contraction cavities produced on the solidification of the mass will occur in the excess material. When casting is done with cement puddle or the like, the inferior cement or "laitance" then depositing on the surface of the casting, may be wholly or partly included in the said excess material.

Preferably, the filling of the sleeve with the solidifying mass is effected in reenforced concrete structures either in immediate connection to the casting of the concrete around the reenforcing members, or, prior to this, early enough to provide ample time for the mass to solidify before the concrete is cast around the reenforcing structure. In the latter case the work may be done either in the structure or in some other locality.

In the accompanying drawing, Fig. 1 is a longitudinal section along line 1—1 of Fig. 2, and Fig. 2 is an end view of an arrangement according to the invention. Fig. 3 is an end view, Fig. 4 a longitudinal section along line 4—4 of Fig. 5, and Fig. 5 a cross-section along line 5—5 of Fig. 4 of a further arrangement according to the invention, the solidifying mass being removed. Fig. 6 is a side view and Fig. 7 an end view of a preferred device to be used, when making joints according to the invention.

Referring to Figs. 1 and 2, 1 designates an iron rod, the end 2 of which is forged into an ovally conical shape and is enclosed within the sleeve 3 having the opening 4 which is restricted by the cone 5 in such a manner that the end of the iron rod affords a snug fit with the said opening 4 of the sleeve, the principal axis of the oval opening 4 being turned 90 degrees with respect to the principal axis of the oval end surface of the iron rod. 6 denotes the base of the sleeve, and said base portion may be united in known manner with some other structure. 7 is the solid mass filling the sleeve about the iron rod.

Referring to Figs. 3 to 5, 17 is a sleeve provided with inside restrictions 18. 19 are apertures permitting the air to escape when the solidifying mass is cast into the sleeve while the latter assumes a horizontal position with the apertures 19 turned upwards. 27 are funnel-shaped parts at the ends of the sleeve. 20 is a hole through which the solidifying mass is cast into the sleeve when the latter is in a horizontal position. 21 are iron rods having swells 22 and rounded end surfaces 23. 24 are longitudinal ridges compelling the swells 22 at the end surface of the iron rods to occupy a central position. 25 are wedges determining the position of the iron rod in the one end of the sleeve, and 26 is a packing ring determining the position of the iron rod in the other end of the sleeve. 28 is a crosstie within the sleeve in the form of a cylindrical pin facilitating introduction of the iron rods into the proper position.

In Figs. 6 and 7, 34 and 35 are two iron rods to be joined within a sleeve 36. 37 is a frame abutting with the bosses 38 against the iron rods 34 and 35. 39 are adjustable clamps attached to the frame 37 by means of the hinges 40 and adapted to clamp the iron rods 34 and 35 against the abutments 38.

Good results are attained in a reenforcing member by completing the member with a joint in which the length of the sleeve equals about six times the diameter of the iron rod, and wherein the inner diameter is about twice, and the restricted opening about 1.5 times the diameter of the iron rod, the end of the latter being conically enlarged to 1.5 times the diameter, and the solidifying mass cast into the sleeve consisting of "ciment fondu."

What I claim as new and desire to secure by Letters Patent of the United States of America is:

1. In a joint of the character described, a sleeve provided with internal swells, a rod provided with a funnel shaped head arranged concentrically within the sleeve, a cross-tie in the sleeve against which the head abuts, guiding ribs arranged longitudinally with the sleeve adjacent the cross-tie for guiding the head of the rod, and a cementitious filling for anchoring the rod within the sleeve.

2. In a joint as claimed in claim 1, wherein a plurality of wedges are arranged in suitable spaced relation about and between the outer ends of the sleeve and the rod for anchoring the rod in a predetermined position within the sleeve.

3. A joint of the character described, a sleeve provided with a series of internal swells adjacent the respective ends, rods arranged concentrically within the respective ends of the sleeve having the inner ends enlarged and rounded and also provided with a plurality of annular funnel-shaped portions exteriorly thereof, the cross-tie arranged transversely and centrally through the sleeve, guiding ribs arranged on the inner surface of the sleeve adjacent the medial portion for guiding the enlarged ends of the rod, and a cementitious filling arranged between the rods and the sleeve for anchoring the rods within the sleeve.

4. A joint as claimed in claim 3, wherein an annular packing is arranged about one rod and one end of the sleeve, the sleeve being provided with apertures, and means arranged about the other end of the sleeve and the other rod for centering said rod, substantially as and for the purposes set forth.

5. In a joint of the character described, a sleeve provided with a series of spaced and longitudinally extending ribs on the inner surface at the medial portion thereof and also provided with a series of annular swells between the ribs and the respective ends of the sleeve, the outer ends of the sleeve being recessed at the inner surface, a cross-tie arranged transversely through the medial portion of the sleeve, a pair of rods, a plurality of suitably spaced annular funnel shaped portions on the external surface thereof, a packing member arranged about one of the rods and situated in the adjacent recess in the end of the sleeve, wedges arranged about the other rod and fitted in the recess at the other end of the sleeve, the sleeve being provided with apertures, and a cementitious filling arranged within the sleeve and about the rod for coacting with the swells and the funnel portions for anchoring the rods within the sleeve, substantially as and for the purposes set forth.

6. In a joint of the character described, a sleeve provided with internal swells, a pair of rods inserted from opposite ends into the sleeve, said rods being spaced from the sleeve and provided with external swells and having their axis substantially coincident, and a filling material within the sleeve and surrounding the rods for coacting with the swells for anchoring the rods within the sleeve.

7. In a joint of the character described, a sleeve provided with internal swells, a pair of rods inserted from opposite ends into the sleeve, said rods being spaced from the sleeve and provided with external swells and having their axis substantially coincident by means of guiding ribs arranged longitudinally within the sleeve for guiding the swells of the rods, and a filling material within the sleeve and surrounding the rods for coacting with the swells for anchoring the rods within the sleeve.

8. In a joint of the character described, a sleeve provided with internal swells, a rod provided with a funnel shaped head arranged concentrically within the sleeve, guiding ribs arranged longitudinally with the sleeve for guiding the head of the rod, and a filling material for anchoring the rod within the sleeve.

9. A joint of the character described, a sleeve provided with a series of internal swells adjacent the respective ends, rods arranged concentrically within the respective ends of the sleeve having the inner ends enlarged and rounded and also provided with a plurality of annular funnel-shaped portions exteriorly thereof, guiding ribs arranged on the inner surface of the sleeve adjacent the medial portion for guiding the enlarged ends of the rod, and a filling material arranged between the rods and the sleeve for anchoring the rods within the sleeve.

10. A joint as claimed in claim 9, wherein an annular packing is arranged about one rod and one end of the sleeve, the sleeve being provided with apertures, and means arranged about the other end of the sleeve and the other rod for centering said rod, substantially as and for the purposes set forth.

11. In a joint of the character described, a sleeve provided with a series of spaced and longitudinally extending ribs on the inner surface at the medial portion thereof and also provided with a series of annular swells between the ribs and the respective ends of the sleeve, the outer ends of the sleeve being recessed at the inner surface, a pair of rods, a plurality of suitably spaced annular funnel shaped portions on the external surface thereof, a packing member arranged about one of the rods and situated in the adjacent recess in the end of the sleeve, wedges arranged about the other rod and fitted in the recess at the other end of the sleeve, the sleeve being provided with apertures, and a filling material arranged within the sleeve and about the rod for coacting with the swells and the funnel portions for anchoring the rods within the sleeve, substantially as and for the purposes set forth.

In testimony whereof I affix my signature.

CARL ABRAHAM FORSSELL.